United States Patent
Tsuda et al.

(10) Patent No.: US 10,074,485 B2
(45) Date of Patent: Sep. 11, 2018

(54) ELECTROLYTIC CAPACITOR, ELECTROLYTIC CAPACITOR MANUFACTURING METHOD, ELECTRODE FOIL, AND ELECTRODE FOIL MANUFACTURING METHOD

(71) Applicant: Panasonic Intellectual Property Management Co., Ltd., Osaka (JP)

(72) Inventors: Yasuhiro Tsuda, Osaka (JP); Junichiro Hiratsuka, Shimane (JP); Kiyoshi Furukawa, Saga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 141 days.

(21) Appl. No.: 15/088,272

(22) Filed: Apr. 1, 2016

(65) Prior Publication Data

US 2016/0217934 A1 Jul. 28, 2016

Related U.S. Application Data

(63) Continuation of application No. PCT/JP2014/005300, filed on Oct. 20, 2014.

(30) Foreign Application Priority Data

Oct. 21, 2013 (JP) .................. 2013-218086

(51) Int. Cl.
*H01G 9/042* (2006.01)
*H01G 9/15* (2006.01)
(Continued)

(52) U.S. Cl.
CPC .......... *H01G 9/028* (2013.01); *H01G 9/0032* (2013.01); *H01G 9/0036* (2013.01); *H01G 9/04* (2013.01); *H01G 9/0425* (2013.01); *H01G 9/15* (2013.01)

(58) Field of Classification Search
CPC ........ H01B 1/02; B05D 53/02; B05D 53/512; H01G 9/0425; H01G 9/042; H01G 9/04
(Continued)

(56) References Cited

U.S. PATENT DOCUMENTS

| 7,643,270 B2 * | 1/2010 | Aoyama ................. H01G 9/04 361/530 |
| 8,416,557 B2 * | 4/2013 | Aoyama .............. H01G 9/0425 29/25.03 |

(Continued)

FOREIGN PATENT DOCUMENTS

| JP | 3-050815 | 3/1991 |
| JP | 10-270291 | 10/1998 |

(Continued)

OTHER PUBLICATIONS

International Search Report of PCT application No. PCT/JP2014/005300 dated Jan. 20, 2015.

*Primary Examiner* — Eric Thomas
(74) *Attorney, Agent, or Firm* — Michael E. Fogarty

(57) ABSTRACT

An electrolytic capacitor includes an anode body formed with a dielectric layer on a surface thereof, a cathode body formed with a nickel layer on a surface thereof, and a solid electrolyte formed between the anode body and the cathode body. The solid electrolyte contains a conductive polymer. The nickel layer contains a nickel crystal grain whose length in a direction perpendicular to a thickness direction of the nickel layer in a cross section taken in the thickness direction is 50 nm or more.

16 Claims, 4 Drawing Sheets

(51) Int. Cl.
*H01G 9/028* (2006.01)
*H01G 9/04* (2006.01)
*H01G 9/00* (2006.01)

(58) Field of Classification Search
USPC ............ 361/516, 532; 427/79–81, 99.2, 115, 427/126.6
See application file for complete search history.

(56) References Cited

U.S. PATENT DOCUMENTS

| | | |
|---|---|---|
| 2009/0027832 A1 | 1/2009 | Aoyama et al. |
| 2010/0202102 A1 | 8/2010 | Aoyama et al. |

FOREIGN PATENT DOCUMENTS

| | | |
|---|---|---|
| JP | 2007-019542 | 1/2007 |
| JP | 2007-036282 | 2/2007 |
| JP | 2009-049373 | 3/2009 |
| JP | 2009-135431 | 6/2009 |

\* cited by examiner

ELECTROLYTIC CAPACITOR, ELECTROLYTIC CAPACITOR MANUFACTURING METHOD, ELECTRODE FOIL, AND ELECTRODE FOIL MANUFACTURING METHOD

BACKGROUND

1. Technical Field

The present disclosure relates to an electrolytic capacitor and a method for manufacturing the electrolytic capacitor, and electrode foil used for an electrode of an electrolytic capacitor or the like and a method for manufacturing the electrode foil.

2. Background Art

With achieving of a high frequency of electronic devices, also in an electrolytic capacitor that is one of electronic components, a large-capacitance electrolytic capacitor that is more excellent in an impedance characteristic in a high frequency region than a conventional electrolytic capacitor is demanded. In order to respond to such a demand, various solid electrolytic capacitors in which a conductive polymer having high electrical conductivity is used as a solid electrolyte is studied.

Such solid electrolytic capacitors are widely employed in a power supply circuit of a personal computer and the like because they have a particularly excellent high frequency characteristic in addition to a life and a temperature characteristic.

In a conventional solid electrolytic capacitor in which aluminum foil is used as an electrode, a dielectric layer of an aluminum oxide film is artificially formed by chemical conversion treatment on a surface of aluminum foil that becomes an anode. On the other hand, aluminum foil that becomes a cathode is not subjected to chemical conversion treatment, and therefore an aluminum oxide film that is artificially formed does not exist on a surface of this aluminum foil. However, the aluminum oxide film actually exits also on the surface of the aluminum foil that becomes the cathode by natural oxidation that occurs from a time when the aluminum foil is manufactured to a time when the aluminum foil is used as the electrode of the solid electrolytic capacitor.

In this case, as a whole of the solid electrolytic capacitor, a layer structure is formed as following; (1) aluminum foil that becomes an anode, (2) an aluminum oxide film formed on a surface of the aluminum foil that becomes the anode, (3) a conductive polymer layer, (4) a film of naturally oxidized aluminum that exists on a surface of aluminum foil that becomes a cathode, and (5) the aluminum foil that becomes the cathode. As a result, the aluminum oxide film that exists on the surface of the aluminum foil that becomes the cathode becomes a dielectric layer, as well as the aluminum oxide film formed on the surface of the aluminum foil that becomes the anode. That is, from a viewpoint of an equivalent circuit, two capacitors are connected in series, and therefore capacitance of a whole of the solid electrolytic capacitor is reduced.

In order to cope with such a problem, cathode foil is disclosed as a method for preventing a capacitance component from generating in the cathode. The cathode foil is obtained by formation of a chemical conversion coating film on the surface of the aluminum foil that becomes the cathode, and further formation of a film of metal nitride such as TiN or a film of metal oxide such as TiO on the chemical conversion coating film by a vapor deposition.

SUMMARY

The present disclosure suppresses generation of a capacitance component generated by metal oxide unintentionally formed on an aluminum foil surface and a rise in Equivalent Series Resistance (ESR), in an electrode using aluminum foil.

Electrode foil of the present disclosure has aluminum foil, and a nickel layer provided on a surface of the aluminum foil. The nickel layer contains a nickel crystal grain whose length in a direction perpendicular to a thickness direction of the nickel layer in a cross section of the nickel layer taken in the thickness direction is 50 nm or more.

When such electrode foil is used as cathode foil of a solid electrolytic capacitor, generation of a capacitance component that becomes negative for whole capacitance of the solid electrolytic capacitor is suppressed, and therefore it is possible to achieve downsizing or large capacitance of the solid electrolytic capacitor.

Furthermore, the nickel layer contains the nickel crystal grains whose length in the direction perpendicular to a thickness direction of the nickel layer in the cross section of the nickel layer taken in the thickness direction is 50 nm or more. Therefore, electric resistance of the nickel layer is small. As a result, it is possible to achieve low ESR of the solid electrolytic capacitor.

DETAILED DESCRIPTION OF THE PREFERRED EMBODIMENT

Prior to description of an exemplary embodiment of the present disclosure, a problem in a conventional solid electrolytic capacitor is briefly described. In the aforementioned conventional solid electrolytic capacitor, metal such as Ti, a nitride thereof, and an oxide thereof are insufficient in resistance to thermal oxidation. Therefore, in a case where such cathode foil is subjected to heat treatment in a capacitor manufacturing process, the oxide film is unintentionally grown. As a result, an electrostatic capacitance component is generated, and furthermore, ESR (Equivalent Series Resistance) is also raised.

Hereinafter, an exemplary embodiment according to the present disclosure is described with reference to drawings.

Figure 1:
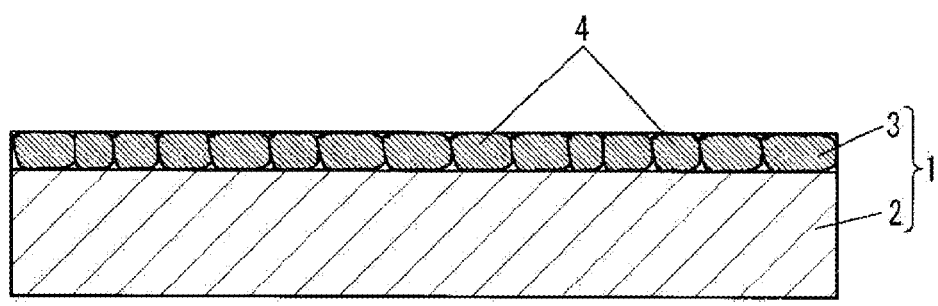
FIG. 1 is a schematic sectional view of electrode foil according to an exemplary embodiment of the present disclosure.

FIG. 1 is a diagram schematically illustrating a cross section of electrode foil according to the present disclosure.

Electrode foil 1 is configured such that nickel layer 3 is formed as a metal layer on a surface of aluminum foil 2 that becomes an electrode.

Aluminum foil 2 is a member used for an electrode of a general electrolytic capacitor, and has suitably a surface roughness Ra in a range from 0.1 µm to 1.3 µm, inclusive. However, in a case where surface roughness Ra is set to a range from 0.1 µm to 1.0 µm, inclusive, when electrode foil 1 is used in a solid electrolytic capacitor, a higher reduction effect of ESR is obtained. Therefore, surface roughness Ra in the range from 0.1 µm to 1.0 µm, inclusive, is more preferable. Ra means arithmetic average roughness.

Nickel layer 3 is mainly formed by an aggregate of nickel crystal grains 4, and the aggregate of these nickel crystal grains 4 has a structure including crystal grains whose length in a width direction in a cross section of nickel layer 3 taken in a thickness direction thereof, that is, whose length in a direction perpendicular to the thickness direction of nickel layer 3 is 50 nm or more.

The nickel layer according to the present disclosure contains nickel or nickel alloy.

Now, a method for manufacturing electrode foil 1 according to the present disclosure is described.

The method for manufacturing electrode foil 1 includes a thin film formation, and a heat treatment.

In the thin film formation, a precursor of nickel layer 3 is formed on a surface of aluminum foil 2.

As a method for forming the precursor of nickel layer 3 on the surface of aluminum foil 2, a vacuum deposition method, a sputtering method, or the like is applicable. However, the vacuum deposition method has a higher film forming rate of the precursor of nickel layer 3, which is more advantageous in cost than other methods.

A thickness of nickel layer 3 formed on the surface of aluminum foil 2 is preferably from 0.1 µm to 0.4 µm, inclusive. When electrode foil 1 is used in a solid electrolytic capacitor, in a case where the thickness of nickel layer 3 is less than 0.1 µm, a reduction effect of ESR is hardly obtained. In a case where the thickness of nickel layer 3 is in a range from 0.1 µm to 0.4 µm, inclusive, a significant reduction effect of ESR is obtained. When the thickness of nickel layer 3 is between 0.1 µm and 0.4 µm, inclusive, the ESR tends to lower as the thickness of nickel layer 3 increases. However, further lowering tendency of the ESR hardly appears in a region where the thickness of nickel layer 3 exceeds 0.4 µm.

In the heat treatment, aluminum foil 2 formed with the precursor of nickel layer 3 on the surface in the thin film formation is subjected to heat treatment at a temperature in a range from 250° C. to 450° C., inclusive, so that nickel layer 3 is formed so as to include crystal grains 4 each of whose length in the width direction in the cross section of nickel layer 3 taken in the thickness direction is 50 nm or more.

As the heat treatment, the following methods are applicable. For example, long aluminum foil 2 formed with the precursor of nickel layer 3 on the surface is wound in a roll shape, or a plurality of sheets of sheet-shaped aluminum foil 2 is stacked, and is left in a high temperature atmosphere. Alternatively, long aluminum foil 2 wound in the roll shape is wound out to be brought into contact with a high temperature roller while aluminum foil 2 is made to travel in a traveling system, and long aluminum foil 2 is wound up again. Among these, a method for leaving aluminum foil 2 in a high temperature atmosphere is preferable. In this method, aluminum foil 2 is not wound out or up, and therefore wrinkles, scratches or the like are less likely to occur in aluminum foil 2, and a number of variable factors such as a conveyance speed and tension of aluminum foil 2 in the traveling system is small. Accordingly, electrode foil 1 having stable quality is easily obtained.

When a temperature in the heat treatment is lower than 250° C., it is difficult to form the nickel layer including nickel crystal grains whose length in the width direction in the cross section of the nickel layer taken in the thickness direction is 50 nm or more, and therefore the temperature needs to be set to 250° C. or more. Additionally, when the temperature in the heat treatment exceeds 450° C., the aluminum foil is deformed, which is not preferable.

Aluminum foil 2 formed with the precursor of nickel layer 3 on the surface is subjected to the heat treatment at 250° C. or more, so that structure phase transition occurs as indicated by a change of an Miller index of nickel crystal grains from (110) before the heat treatment to (100) or (111). As a result, a work function of nickel layer 3 becomes 5.0 eV or more.

Now, examples of the present disclosure are described.

EXAMPLE 1

In Example 1, as a thin film formation, nickel is deposited on a surface of aluminum foil by a vacuum deposition method to form a precursor of a nickel layer.

More specifically, in a vacuum chamber, long aluminum foil wound up in a roll shape is wound out to be made to travel, and is supported along a rotating cooling roll. Additionally, vapor of nickel is supplied from a vapor source while the aluminum foil is cooled, so that the precursor of the nickel layer is formed on a first surface of the aluminum foil, and the aluminum foil formed with the precursor of the nickel layer on the first surface is wound up in the roll shape again.

An electron beam is applied to nickel in order to melt the nickel in the vapor source.

A thickness of the precursor of the nickel layer is controlled by adjusting a traveling speed of the aluminum foil and output of the electron beam.

A precursor of the nickel layer is formed also on a second surface of the aluminum foil by a method identical with the above method.

In a heat treatment, the aluminum foil formed with the precursors of the nickel layer on the surfaces and wound up in the roll shape is left in a high temperature chamber to be subjected to heat treatment.

More specifically, the aluminum foil formed with the precursors of the nickel layers on the surfaces and wound up in the roll shape is put in the high temperature chamber whose inside temperature is a normal temperature. Then, after the high temperature chamber is heated up to 250° C. and maintained at 250° C. for one hour, the high temperature chamber is naturally cooled.

In Example 1, aluminum foil having a thickness of 30 µm, and surface roughness Ra of 0.1 µm is used.

In the thin film formation, a thickness of each of the precursors of the nickel layers formed on the surfaces of the aluminum foil is 0.1 µm.

With regard to the sizes of the nickel crystal grains forming the nickel layer formed on each surface of the aluminum foil before the heat treatment in the width direction in the cross section of the nickel layer taken in the thickness direction of the nickel layer, a size of the largest crystal grain is 33 nm, a size of the smallest crystal grain is 14 nm, the average is 22 nm, and no crystal grain having a size of 50 nm or more exists. Then, after the heat treatment, existence of crystal grains each having a size of 50 nm or more is confirmed, and the average size of the crystal grains of 50 nm or more is 54 nm. Additionally, the work function of the nickel layer is 5.0 eV.

EXAMPLE 2

In Example 2, electrode foil is produced in the same conditions as Example 1 except that a temperature of the high temperature chamber is raised up to 300° C. from a normal temperature state, and is maintained at 300° C. for one hour in the heat treatment.

In the nickel layer of the electrode foil produced in Example 2 after the heat treatment, existence of crystal grains each having a length of 50 nm or more is confirmed. The length (size) is measured along a width direction in a cross section of the nickel layer taken in a thickness direction of the nickel layer, and the average size of the crystal grains of 50 nm or more is 79 nm. Additionally, the work function of the nickel layer is 5.2 eV.

EXAMPLE 3

In Example 3, electrode foil is produced in the same conditions as Example 1 except that a temperature of the high temperature chamber is raised up to 400° C. from a normal temperature state, and is maintained at 400° C. for one hour, in the heat treatment.

In the nickel layer of the electrode foil produced in Example 3 after the heat treatment, existence of crystal grains each having a length of 50 nm or more is confirmed. The length (size) is measured along a width direction in a cross section of the nickel layer taken in a thickness direction of the nickel layer, and the average size of the crystal grains of 50 nm or more is 118 nm. Additionally, the work function of the nickel layer is 5.4 eV.

EXAMPLE 4

In Example 4, electrode foil is produced in the same conditions as Example 1 except that a temperature of the high temperature chamber is raised up to 450° C. from a normal temperature state, and is maintained at 450° C. for one hour, in the heat treatment.

In the nickel layer of the electrode foil produced in Example 4 after the heat treatment, existence of crystal grains each having a length of 50 nm or more is confirmed. The length (size) is measured along a width direction in a cross section of the nickel layer taken in a thickness direction of the nickel layer, and the average size of the crystal grains of 50 nm or more is 152 nm. Additionally, the work function of the nickel layer is 5.5 eV.

EXAMPLE 5

In Example 5, electrode foil is produced in the same conditions as Example 1, except that a temperature of the high temperature chamber is raised up to 400° C. from a normal temperature state, is maintained at 400° C. for ten hours, in the heat treatment.

In the nickel layer of the electrode foil produced in Example 5 after the heat treatment, existence of crystal grains each having a length of 50 nm or more is confirmed. The length (size) is measured along a width direction in a cross section of the nickel layer in a thickness direction of the nickel layer, and the average size of the crystal grains of 50 nm or more is 406 nm. Additionally, the work function of the nickel layer is 5.4 eV.

EXAMPLE 6

In Example 6, electrode foil is produced in the same condition as Example 1 except for using aluminum foil with surface roughness Ra of 0.5 μm.

With regard to the sizes of the nickel crystal grains forming the nickel layer formed on each surface of the aluminum foil before the heat treatment in a width direction in a cross section of the nickel layer in a thickness direction of the nickel layer in the electrode foil produced in Example 6, a size of the largest crystal grain is 33 nm, a size of the smallest crystal grain is 11 nm, the average is 24 nm, and no crystal grain having a size of 50 nm or more exists. Then, after the heat treatment, existence of crystal grains each having a size of 50 nm or more is confirmed, and the average size of the crystal grains of 50 nm or more is 57 nm. Additionally, the work function of the nickel layer is 5.0 eV.

EXAMPLE 7

In Example 7, electrode foil is produced in the same condition as Example 2 except that aluminum foil with surface roughness Ra of 0.5 μm is used, and in a thin film formation, a precursor of a nickel layer is formed on each surface of aluminum foil with a thickness of 0.4 μm.

With regard to the sizes of the nickel crystal grains forming the nickel layer formed on each surface of the aluminum foil before the heat treatment in a width direction in a cross section of the nickel layer taken in a thickness direction of the nickel layer in the electrode foil produced in Example 7, a size of the largest crystal grain is 30 nm, a size of the smallest crystal grain is 12 nm, the average is 22 nm, and no crystal grain having a size of 50 nm or more exists. Then, after the heat treatment, existence of crystal grains each having a size of 50 nm or more is confirmed, and the average size of the crystal grains of 50 nm or more is 80 nm Additionally, the work function of the nickel layer is 5.2 eV.

EXAMPLE 8

In Example 8, electrode foil is produced in the same condition as Example 3 except for using the aluminum foil formed with the precursors of the nickel layers on the surfaces, which is produced in the thin film formation of Example 7.

In the nickel layer of the electrode foil produced in Example 8 after the heat treatment, existence of crystal grains each having a length of 50 nm or more is confirmed. The length (size) is measured along a width direction in a cross section of the nickel layer in a thickness direction of the nickel layer, and the average size of the crystal grains of 50 nm or more is 118 nm. Additionally, the work function of the nickel layer is 5.4 eV.

EXAMPLE 9

In Example 9, electrode foil is produced in the same condition as Example 4 except for using the aluminum foil formed with the precursors of the nickel layers on the surfaces, which is produced in the thin film formation of Example 6.

In the nickel layer of the electrode foil produced in Example 9 after the heat treatment, existence of crystal grains each having a length of 50 nm or more is confirmed. The length (size) is measured along a width direction in a cross section of the nickel layer in a thickness direction of the nickel layer, and the average size of the crystal grains of 50 nm or more is 150 nm. Additionally, the work function of the nickel layer is 5.5 eV.

EXAMPLE 10

In Example 10, electrode foil is produced in the same condition as Example 5 except for using the aluminum foil formed with the precursors of the nickel layers on the surfaces, which is produced in the thin film formation of Example 6.

In the nickel layer of the electrode foil produced in Example 10 after the heat treatment, existence of crystal grains each having a length of 50 nm or more is confirmed. The length (size) is measured along a width direction in a cross section of the nickel layer taken in a thickness direction of the nickel layer, and the average size of the crystal grains of 50 nm or more is 403 nm. Additionally, the work function of the nickel layer is 5.4 eV.

EXAMPLE 11

In Example 11, electrode foil is produced in the same condition as Example 1 except for using aluminum foil with surface roughness Ra of 1.0 μm.

With regard to the sizes of the nickel crystal grains forming the nickel layer formed on each surface of the aluminum foil before the heat treatment in a width direction in a cross section of the nickel layer in a thickness direction of the nickel layer in the electrode foil produced in Example 11, a size of the largest crystal grain is 28 nm, a size of the smallest crystal grain is 10 nm, the average is 20 nm, and no crystal grain having a size of 50 nm or more exists. Then, after the heat treatment, existence of crystal grains each having a size of 50 nm or more is confirmed, and the average size of the crystal grains of 50 nm or more is 55 nm. Additionally, the work function of the nickel layer is 5.0 eV.

EXAMPLE 12

In Example 12, electrode foil is produced in the same condition as Example 2 except for using the aluminum foil formed with the precursors of the nickel layers on the surfaces, which is produced in the thin film formation of Example 11.

In the nickel layer of the electrode foil produced in Example 12 after the heat treatment, existence of crystal grains each having a length of 50 nm or more is confirmed. The length (size) is measured along a width direction in a cross section of the nickel layer taken in a thickness direction of the nickel layer, and the average size of the crystal grains of 50 nm or more is 79 nm. Additionally, the work function of the nickel layer is 5.2 eV.

EXAMPLE 13

In Example 13, electrode foil is produced in the same condition as Example 3 except for using the aluminum foil formed with the precursors of the nickel layers on the surfaces, which is produced in the thin film formation of Example 11.

In the nickel layer of the electrode foil produced in Example 13 after the heat treatment, existence of crystal grains each having a length of 50 nm or more is confirmed. The length (size) is measured along a width direction in a cross section of the nickel layer in a thickness direction of the nickel layer, and the average size of the crystal grains of 50 nm or more is 113 nm. Additionally, the work function of the nickel layer is 5.4 eV.

EXAMPLE 14

In Example 14, electrode foil is produced in the same condition as Example 4 except for using the aluminum foil formed with the precursors of the nickel layers on the surfaces, which is produced in the thin film formation of Example 11.

In the nickel layer of the electrode foil produced in Example 14 after the heat treatment, existence of crystal grains each having a length of 50 nm or more is confirmed. The length (size) is measured along a width direction in a cross section of the nickel layer in a thickness direction of the nickel layer, and the average size of the crystal grains of 50 nm or more is 150 nm. Additionally, the work function of the nickel layer is 5.5 eV.

EXAMPLE 15

In Example 15, electrode foil is produced in the same condition as Example 5 except for using the aluminum foil formed with the precursors of the nickel layers on the surfaces, which is produced in the thin film formation of Example 11.

In the nickel layer of the electrode foil produced in Example 15 after the heat treatment, existence of crystal grains each having a length of 50 nm or more is confirmed. The length (size) is measured along a width direction in a cross section of the nickel layer in a thickness direction of the nickel layer, and the average size of the crystal grains of 50 nm or more is 403 nm. Additionally, the work function of the nickel layer is 5.4 eV.

EXAMPLE 16

In Example 16, electrode foil is produced in the same condition as Example 1 except for using surface aluminum foil with roughness Ra of 1.3 μm.

With regard to the sizes of the nickel crystal grains forming the nickel layer formed on each surface of the aluminum foil before the heat treatment in a width direction in a cross section of the nickel layer in a thickness direction of the nickel layer in the electrode foil produced in Example 16, a size of the largest crystal grain is 29 nm, a size of the smallest crystal grain is 10 nm, the average is 20 nm, and no crystal grain having a size of 50 nm or more exists. Then, after the heat treatment, a size of the largest crystal grain is 50 nm, a size of the smallest crystal grain is 34 nm, and existence of crystal grains each having a size of 50 nm or more is confirmed, and the average size of the crystal grains of 50 nm or more is 50 nm. Additionally, the work function of the nickel layer is 5.0 eV.

EXAMPLE 17

In Example 17, electrode foil is produced in the same condition as Example 2 except for using the aluminum foil formed with the precursors of the nickel layers on the surfaces, which is produced in the thin film formation of Example 16.

In the nickel layer of the electrode foil produced in Example 17 after the heat treatment, existence of crystal grains each having a length of 50 nm or more is confirmed. The length (size) is measured along a width direction in a cross section of the nickel layer in a thickness direction of the nickel layer, and the average size of the crystal grains of 50 nm or more is 70 nm. Additionally, the work function of the nickel layer is 5.2 eV.

EXAMPLE 18

In Example 18, electrode foil is produced in the same condition as Example 3 except for using the aluminum foil formed with the precursors of the nickel layers on the surfaces, which is produced in the thin film formation of Example 16.

In the nickel layer of the electrode foil produced in Example 18 after the heat treatment, existence of crystal grains each having a length of 50 nm or more is confirmed. The length (size) is measured along a width direction in a cross section of the nickel layer in a thickness direction of the nickel layer, and the average size of the crystal grains of 50 nm or more is 113 nm. Additionally, the work function of the nickel layer is 5.4 eV.

EXAMPLE 19

In Example 19, electrode foil is produced in the same condition as Example 4 except for using the aluminum foil formed with the precursors of the nickel layers on the surfaces, which is produced in the thin film formation of Example 16.

In the nickel layer of the electrode foil produced in Example 19 after the heat treatment, existence of crystal grains each having a length of 50 nm or more is confirmed. The length (size) is measured along a width direction in a cross section of the nickel layer in a thickness direction of the nickel layer, and the average size of the crystal grains with 50 nm or more is 151 nm. Additionally, the work function of the nickel layer is 5.5 eV.

EXAMPLE 20

In Example 20, electrode foil is produced in the same condition as Example 5 except for using the aluminum foil formed with the precursors of the nickel layers on the surfaces, which is produced in the thin film formation of Example 16.

In the nickel layer of the electrode foil produced in Example 20 after the heat treatment, existence of crystal grains each having a length of 50 nm or more is confirmed. The length (size) is measured along a width direction in a cross section of the nickel layer in a thickness direction of the nickel layer, and the average size of the crystal grains of 50 nm or more is 410 nm. Additionally, the work function of the nickel layer is 5.4 eV.

Now, comparative examples are described.

COMPARATIVE EXAMPLE 1

In Comparative Example 1, electrode foil is produced in the same condition as Example 1 except that a temperature of the high temperature chamber is raised up to 200° C. from a normal temperature state, and is maintained at 200° C. for one hour in the heat treatment.

In the nickel layer of the electrode foil produced in Comparative Example 1 after the heat treatment, the average size of nickel crystal grains is 38 nm, and no crystal grain having a size of 50 nm or more exists. The size is measured along a width direction in a cross section of the nickel layer taken in a thickness direction of the nickel layer.

COMPARATIVE EXAMPLE 2

In Comparative Example 2, electrode foil is produced in the same condition as Example 6 except that a temperature of the high temperature chamber is raised up to 200° C. from a normal temperature state, and is maintained at 200° C. for one hour in the heat treatment.

In the nickel layer of the electrode foil produced in Comparative Example 2 after the heat treatment, the average size of nickel crystal grains is 38 nm, and no crystal grain having a size of 50 nm or more exists. The size is measured along a width direction in a cross section of the nickel layer taken in a thickness direction of the nickel layer.

COMPARATIVE EXAMPLE 3

In Comparative Example 3, electrode foil is produced in the same condition as Example 11 except that a temperature of the high temperature chamber is raised up to 200° C. from a normal temperature state, and is maintained at 200° C. for one hour in the heat treatment.

In the nickel layer of the electrode foil produced in Comparative Example 3 after the heat treatment, the average size of nickel crystal grains is 33 nm, and no crystal grain having a size of 50 nm or more exists. The size is measured along a width direction in a cross section of the nickel layer taken in a thickness direction of the nickel layer.

COMPARATIVE EXAMPLE 4

In Comparative Example 4, electrode foil is produced in the same condition as Example 16 except that a temperature of the high temperature chamber is raised up to 200° C. from a normal temperature state, and is maintained at 200° C. for one hour in the heat treatment.

In the nickel layer of the electrode foil produced in Comparative Example 4 after the heat treatment, the average size of nickel crystal grains is 37 nm, and no crystal grain having a size of 50 nm or more exists.

In the above Comparative Examples 1 to 4, each of the work functions of the nickel layers formed on the surfaces of the aluminum foil is 4.9 eV.

The size of each nickel crystal grain in the width direction in the cross section of the nickel layer in the thickness direction of the nickel layer is determined as following: the electrode foil formed with the nickel layer on each surface of the aluminum foil is sliced in a thickness direction to prepare a test piece. A state in the cross section of the test piece is observed and photographed by a transmission electron microscope, and a maximum size of each of the nickel crystal grains in the width direction of the cross section of the nickel layer in the thickness direction of the nickel layer is measured from the photographed cross section photograph. This maximum size is defined as the size in the width direction.

Figure 2A:
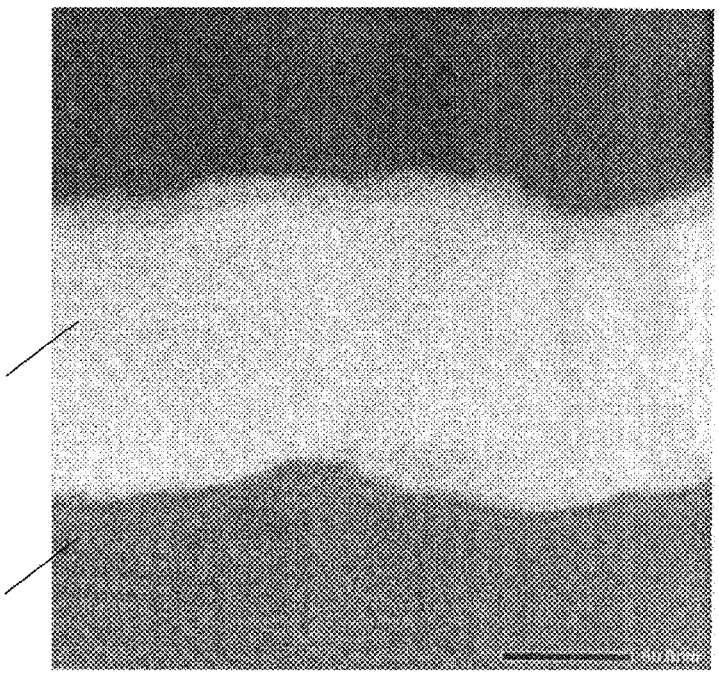
FIG. 2A is a transmission electron microscopic view of a cross section of aluminum foil after formation of a precursor of a nickel layer on a surface followed by heat treatment according to the exemplary embodiment of the present disclosure.
Figure 2B:
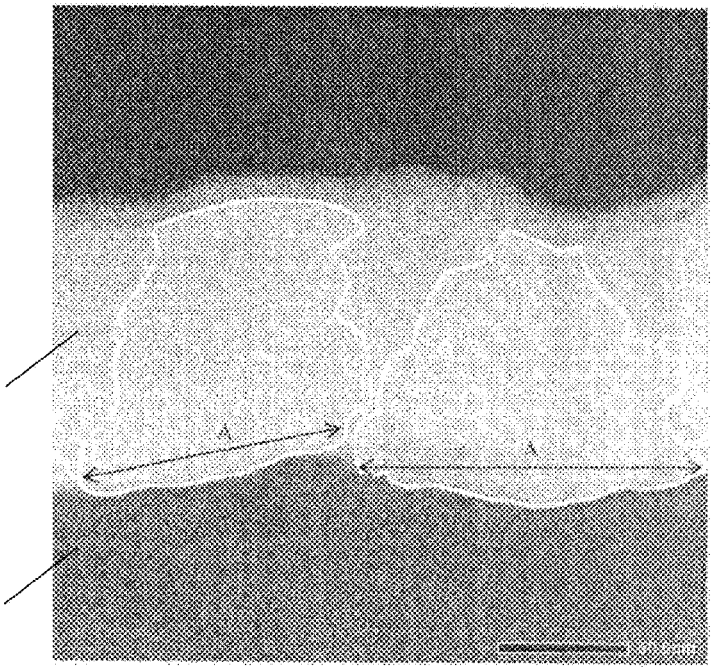
FIG. 2B is a diagram representing a transmission electron microscopic view of FIG. 2A, in which contour lines for emphasizing contours of nickel crystal grains are added.
Figure 3A:
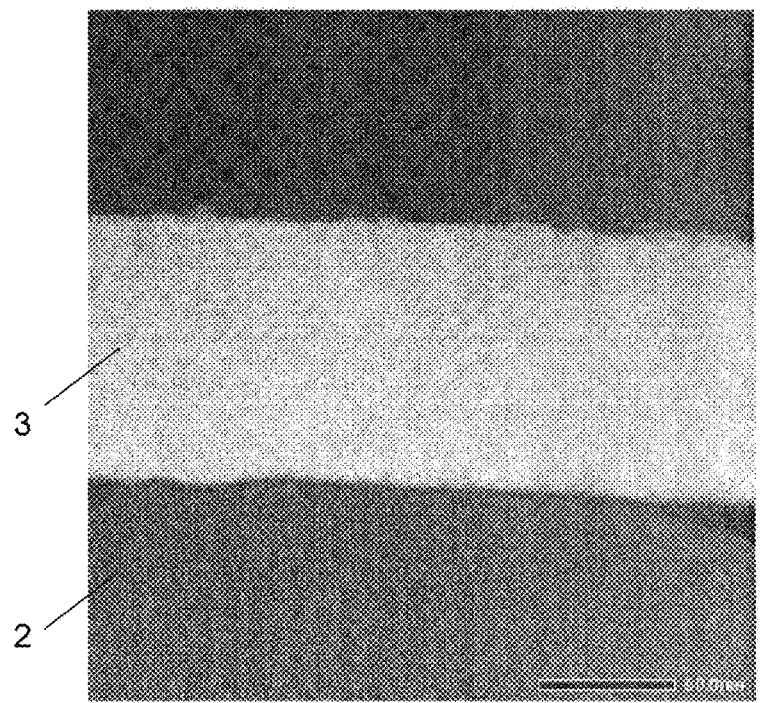
FIG. 3A is a transmission electron microscopic view of a cross section of aluminum foil after formation of a precursor of a nickel layer on a surface and before the heat treatment according to the exemplary embodiment of the present disclosure.
Figure 3B:
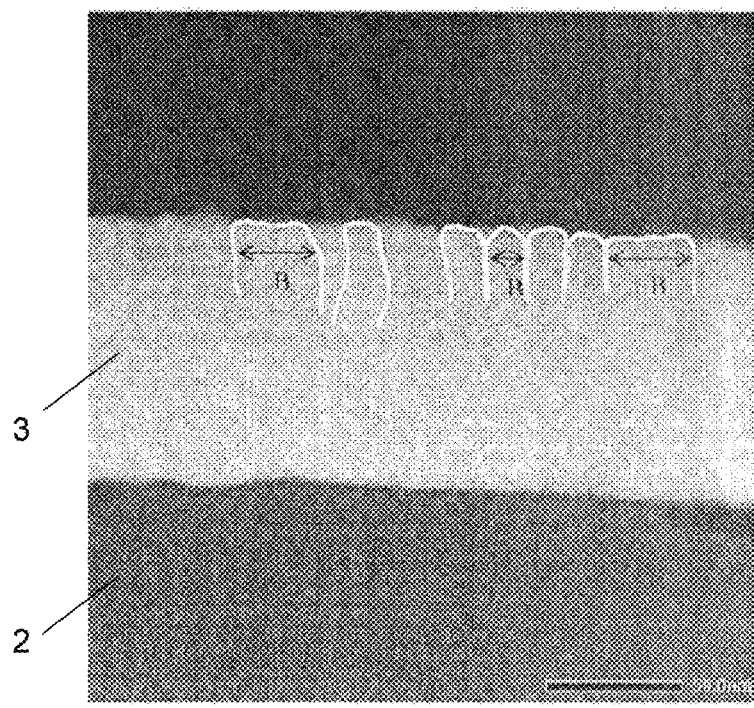
FIG. 3B is a diagram representing a transmission electron microscopic view of FIG. 3A, in which contour lines for emphasizing contours of nickel crystal grains are added.

The sizes of the nickel crystal grains in each example are described with reference to FIG. 2A to FIG. 3B. FIG. 2A is a transmission electron microscope photograph of a cross section of the aluminum foil in the thickness direction of the aluminum foil after the heat treatment of Example 3 of the present disclosure. FIG. 2B is a transmission electron microscope photograph in which contour lines are added in order to emphasize contours of the nickel crystal grains in FIG. 2A. FIG. 3A is a transmission electron microscope photograph of a cross section of aluminum foil in the thickness direction of the aluminum foil of Example 3 of the present disclosure, which is not subjected to the heat treatment after thin film formation. FIG. 3B is a transmission electron microscope photograph in which contour lines are added in order to emphasize contours of the nickel crystal grains in FIG. 3A. In each of FIG. 2A, FIG. 2B, FIG. 3A, and FIG. 3B, nickel layer 3 formed of an aggregate of nickel crystal grains is formed on the surface of aluminum foil 2.

As illustrated in FIG. 2B, the size of each of the nickel crystal grains (reference character A in FIG. 2B) of the nickel layer in the width direction in the cross section of the nickel layer in the thickness direction of the nickel layer is 100 nm to 131 nm after heat treatment, and it is found that crystal grains each having a size of 50 nm or more exists.

On the other hand, as illustrated in FIG. 3B, after thin film formation before heat treatment, the size of each of the nickel crystal grains (reference character B in FIG. 3B) of the nickel layer in the width direction in the cross section of the nickel layer in the thickness direction of the nickel layer is about 14 nm to 33 nm, and crystal grains each having a size of 50 nm or more do not exist.

In each example, nickel crystal grains, whose sizes in the width direction in the cross section of the nickel layer in the thickness direction of the nickel layer are 50 nm or more, exist on the cross section. The total of areas of cross sections of the nickel crystal grains occupied 40% or more of a total of areas of the cross section of the nickel layer.

(Production of Solid Electrolytic Capacitor)

Now, a solid electrolytic capacitor produced by use of electrode foil according to each of the above examples and comparative examples is described.

Figure 4:
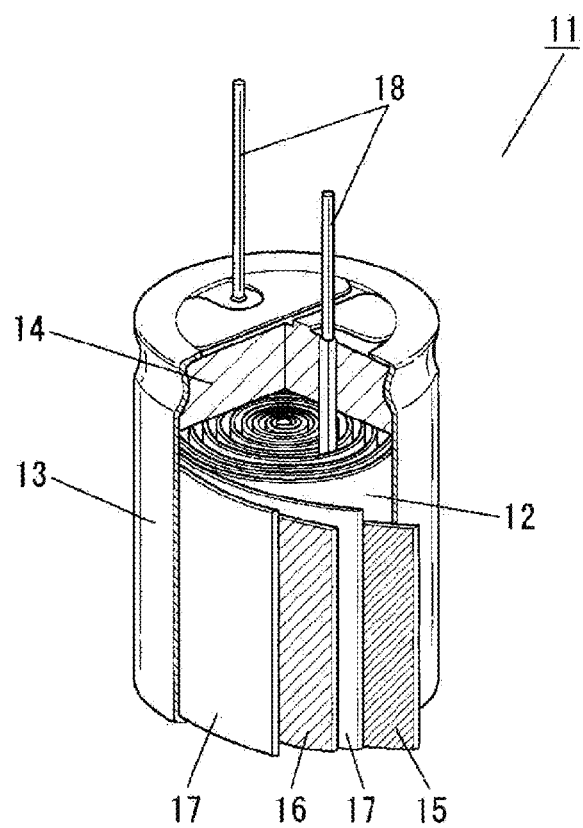
FIG. 4 is a partially cross sectional perspective view of a solid electrolytic capacitor according to the exemplary embodiment of the present disclosure.

As illustrated in FIG. 4, solid electrolytic capacitor 11 provided for evaluation includes capacitor element 12, bottomed cylindrical aluminum case 13 that houses capacitor element 12, and sealing member 14 made of butyl rubber. Capacitor element 12 has cathode body 15, anode body 16 and separator 17 disposed between cathode body 15 and anode body 16. Cathode body 15 is the electrode foil produced in each example or each comparative example. Anode body 16 includes aluminum foil and a dielectric layer of an aluminum oxide film disposed on a surface of this aluminum foil. Cathode body 15, anode body 16 and separator 17 are stacked and wound. In and around separator 17, a solid electrolyte (not illustrated) is disposed. Lead wires 18 are connected to anode body 16 and cathode body 15, respectively. A conductive polymer that becomes the solid electrolyte is polyethyleneclioxy thiophene, which is formed as following: a solution containing ethylenedioxythiophene as a heterocyclic monomer, ferric p-toluenesulfonate as an oxidant, and n-butanol as a polymerization solvent is prepared. A winding body formed by stacking and winding of anode body 16, cathode body 15, and separator 17 is immersed in the solution, and above-mentioned monomer is polymerized in a high temperature atmosphere after pulling up the winding body out of the solution, so that the conductive polymer is formed.

The work function of polyethylenedioxy thiophene used as the conductive polymer that became the solid electrolyte is 4.9 eV.

Note here that the conductive polymer that becomes the solid electrolyte is not limited to polyethyleneclioxy thiophene, but polythiophene or a derivative of polythiophene, which contains polyethyleneclioxy thiophene, is preferable. Additionally, a plurality of different kinds of conductive polymers may be simultaneously used.

Thus, a solid electrolytic capacitor having a rated voltage of 2.5 V, and capacitance of 820 μF is produced.

(Evaluation Result)

ESR of the solid electrolytic capacitor produced by use of the electrode foil according to each of the above examples and comparative examples is measured. A result of the measurement is illustrated in Table 1.

TABLE 1

|  | Surface roughness Ra (μm) | Heat treatment temp. (° C.) | Existence or Absence of grain of 50 μm or more | Average size of grains of 50 μm or more (nm) | ESR (mΩ) |
| --- | --- | --- | --- | --- | --- |
| Example 1 | 0.1 | 250 | Existence | 54 | 7.1 |
| Example 2 | 0.1 | 300 | Existence | 79 | 6.8 |
| Example 3 | 0.1 | 400 | Existence | 118 | 6.6 |
| Example 4 | 0.1 | 450 | Existence | 152 | 6.6 |
| Example 5 | 0.1 | 400 | Existence | 406 | 6.4 |
| Example 6 | 0.5 | 250 | Existence | 57 | 8.0 |
| Example 7 | 0.5 | 300 | Existence | 80 | 7.5 |
| Example 8 | 0.5 | 400 | Existence | 118 | 7.2 |
| Example 9 | 0.5 | 450 | Existence | 150 | 7.2 |
| Example 10 | 0.5 | 400 | Existence | 403 | 7.0 |
| Example 11 | 1.0 | 250 | Existence | 55 | 10.1 |
| Example 12 | 1.0 | 300 | Existence | 79 | 9.7 |
| Example 13 | 1.0 | 400 | Existence | 113 | 9.6 |
| Example 14 | 1.0 | 450 | Existence | 150 | 9.6 |
| Example 15 | 1.0 | 400 | Existence | 403 | 7.3 |
| Example 16 | 1.3 | 250 | Existence | 50 | 12.9 |
| Example 17 | 1.3 | 300 | Existence | 70 | 12.2 |
| Example 18 | 1.3 | 400 | Existence | 113 | 11.9 |
| Example 19 | 1.3 | 450 | Existence | 151 | 11.8 |
| Example 20 | 1.3 | 400 | Existence | 410 | 10.5 |
| Comparative Example 1 | 0.1 | 200 | Absence | — | 14.5 |
| Comparative Example 2 | 0.5 | 200 | Absence | — | 14.8 |
| Comparative Example 3 | 1.0 | 200 | Absence | — | 16.1 |
| Comparative Example 4 | 1.3 | 200 | Absence | — | 16.5 |

In the electrode foil of each of Examples 1 to 20, existence of nickel crystal grains, each of whose sizes in the width direction in the cross section of the nickel layer in the thickness direction of the nickel layer is 50 nm or more, is recognized. As shown in Table 1, ESR of the solid electrolytic capacitor using the electrode foil is 6.4 mΩ to 12.9 mΩ. On the other hand, in the electrode foil of each of Comparative Examples 1 to 4, existence of nickel crystal grains, each of whose sizes in the width direction in the cross section of the nickel layer in the thickness direction of the nickel layer is 50 nm or more, is not recognized. ESR of the solid electrolytic capacitor using the electrode foil is 14.5 mΩ to 16.5 mΩ. Thus, a significant reduction effect of the ESR is recognized in each of Examples 1 to 20, compared to each of Comparative Examples 1 to 4.

By setting of the size of each of the nickel crystal grains forming the nickel layer in the width direction in the cross section of the nickel layer in the thickness direction of the nickel layer to 50 nm or more, a number of crystal grain boundaries in nickel crystal grains is reduced. As a result, the electric resistance of the nickel layer is lowered. The above-mentioned reduction effect of the ESR is obtained by the action as described here.

In addition to the above action, the work function of the nickel layer is made higher than the work function of the conductive polymer being the solid electrolyte, so that action of lowering contact resistance between the nickel layer and the conductive polymer that is the solid electrolyte also contributes.

The electrode foil using the aluminum foil having surface roughness Ra of 1.0 μm or less, like each of Examples 1 to 15, can further lower the ESR of the solid electrolytic capacitor, compared to the electrode foil using the aluminum foil having surface roughness Ra of 1.3 μm, like each of Examples 16 to 20.

In order to form electrode foil such that a size of each of nickel crystal grains in a width direction in a cross section of the nickel layer in a thickness direction of the nickel layer is 50 nm or more, aluminum foil formed with a nickel layers on surfaces is simply subjected to heat treatment at a temperature of 250° C. or higher.

The winding type solid electrolytic capacitor is exemplified in the above examples, but the present disclosure can be applied also to a laminated type solid electrolytic capacitor.

Additionally, the materials, the conditions, and the like described in the above examples are merely an example for describing disclosure, and the present disclosure is not limited to these.

The present disclosure has an effect capable of implementing reduction in size and increase in capacitance of an electrolytic capacitor, and reduction in ESR of the electrolytic capacitor at the same time, and is useful for capacitors in various fields.

What is claimed is:

1. An electrolytic capacitor comprising:
an anode body formed with a dielectric layer on a surface thereof;
a cathode body formed with a nickel layer on a surface thereof; and
a solid electrolyte formed between the anode body and the cathode body, and containing a conductive polymer,
wherein the nickel layer contains a nickel crystal grain whose length in a direction perpendicular to a thickness direction of the nickel layer in a cross section of the nickel layer taken in the thickness direction is not less than 50 nm and not more than 410 nm.

2. The electrolytic capacitor according to claim 1,
wherein a proportion of an area occupied by the crystal grain in the cross section of the nickel layer is 40% or more.

3. The electrolytic capacitor according to claim 1,
wherein the crystal grain has a lattice plane parallel to a surface of the nickel layer, and
Miller index of the lattice plane is (100) or (111).

4. The electrolytic capacitor according to claim 1,
wherein a work function of the nickel layer is larger than a work function of the conductive polymer.

5. The electrolytic capacitor according to claim 1,
wherein a work function of the nickel layer is 5.0 eV or more.

6. The electrolytic capacitor according to claim 1,
wherein the conductive polymer contains polythiophene or a derivative of polythiophene.

7. The electrolytic capacitor according to claim 1,
wherein the cathode body is aluminum foil, and
wherein a surface roughness of the aluminum foil in arithmetic average roughness is in a range from 0.1 μm to 1 μm, inclusive.

8. An electrolytic capacitor comprising:
an anode body formed with a dielectric layer on a surface;
a cathode body formed with a metal layer on a surface; and
a solid electrolyte formed between the anode body and the cathode body, and containing a conductive polymer,
wherein a work function of the metal layer is larger than a work function of the conductive polymer.

9. A method for manufacturing an electrolytic capacitor, comprising:
forming a dielectric layer on a surface of an anode body;
forming a nickel layer on a surface of a cathode body; and
producing a capacitor element including the anode body and the cathode body; and
impregnating the capacitor element with a solid electrolyte containing a conductive polymer,
wherein when the nickel layer is formed on the surface of the cathode body, a nickel layer precursor film is formed on the surface of the cathode body, and the nickel layer precursor film is subjected to heat treatment at a temperature of not less than 250° C. and not more than 450° C.

10. The method for manufacturing an electrolytic capacitor according to claim 9,
wherein the conductive polymer contains polythiophene or a derivative of polythiophene.

11. An electrode foil comprising:
aluminum foil; and
a nickel layer provided on a surface of the aluminum foil,
wherein the nickel layer contains a nickel crystal grain whose length in a direction perpendicular to a thickness direction of the nickel layer in a cross section of the nickel layer taken in the thickness direction is not less than 50 nm and not more than 410 nm.

12. The electrode foil according to claim 11,
wherein a proportion of an area occupied by the crystal grain in the cross section of the nickel layer is 40% or more.

13. The electrode foil according to claim 11,
wherein the crystal grain has a lattice plane parallel to a surface of the nickel layer, and
Miller index of the lattice plane is (100) or (111) being.

14. The electrode foil according to claim 11,
wherein a work function of the nickel layer is 5.0 eV or more.

15. The electrode foil according to claim 11,
wherein a surface roughness of the aluminum foil in arithmetic average roughness is in a range from 0.1 μm to 1 μm, inclusive.

16. A method for manufacturing an electrode foil, comprising:
forming a nickel layer precursor film on a surface of aluminum foil; and
subjecting the nickel layer precursor film to heat treatment at a temperature of not less than 250° C. and not more than 450° C. so as to form a nickel layer on the surface of the aluminum foil.

* * * * *